Dec. 27, 1949  S. H. M. DODINGTON  2,492,137
PULSE TRANSLATOR
Filed Sept. 21, 1945  2 Sheets-Sheet 1
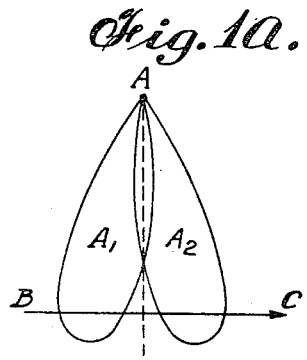
*Fig. 1a.*
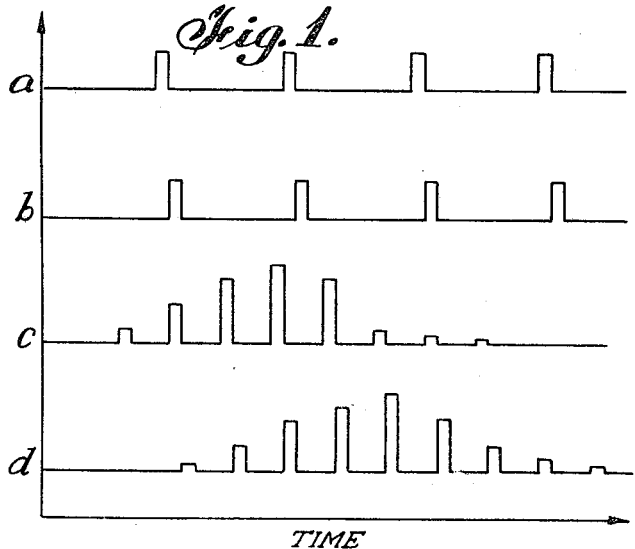
*Fig. 1.*
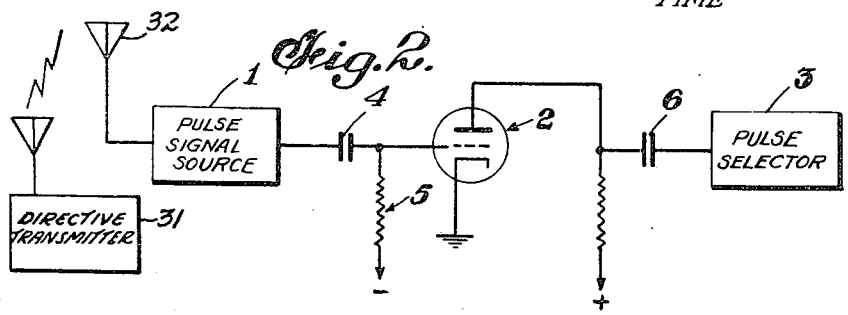
*Fig. 2.*
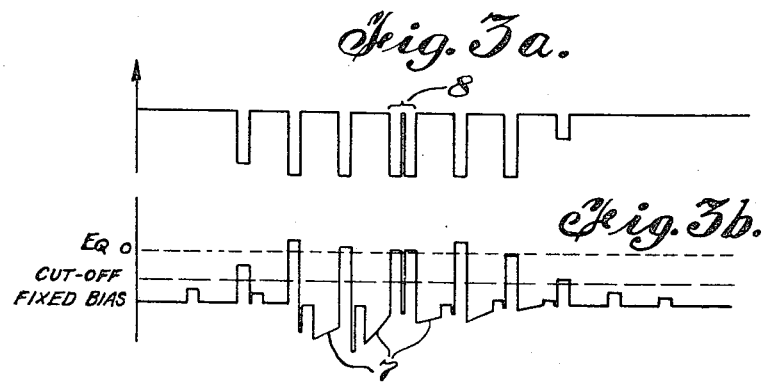
*Fig. 3a.*
*Fig. 3b.*
INVENTOR.
SVEN H. M. DODINGTON
BY
*Percy P. Lantzy*
ATTORNEY Dec. 27, 1949       S. H. M. DODINGTON       2,492,137
PULSE TRANSLATOR
Filed Sept. 21, 1945       2 Sheets-Sheet 2
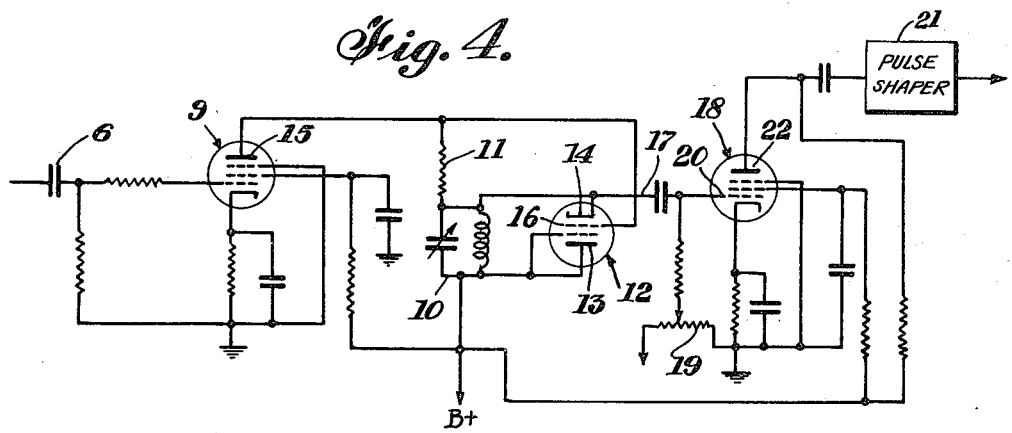
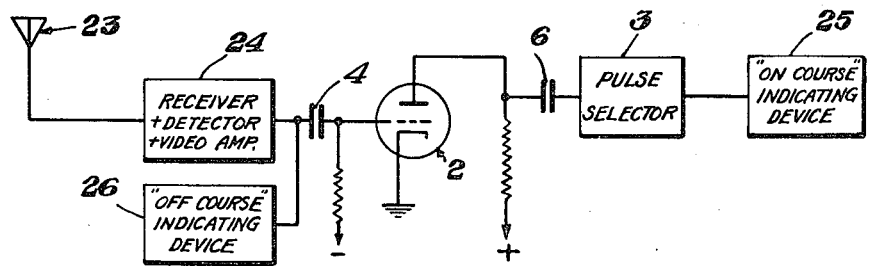
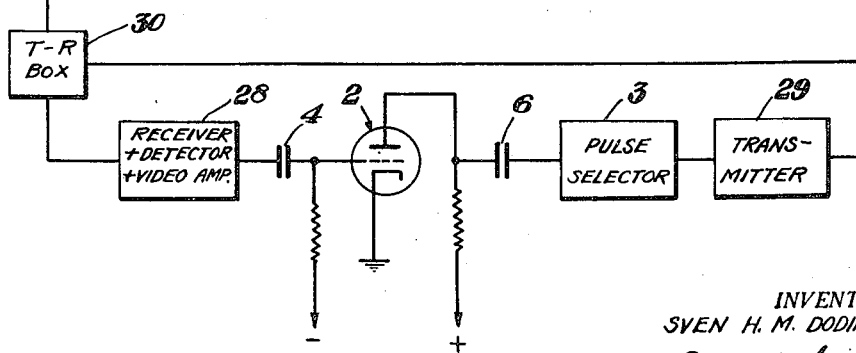
INVENTOR.
SVEN H. M. DODINGTON
BY *Percy P. Lantzy*
ATTORNEY Patented Dec. 27, 1949

2,492,137

UNITED STATES PATENT OFFICE 2,492,137

PULSE TRANSLATOR

Sven H. M. Dodington, Forest Hills, N. Y., assignor to Federal Telephone and Radio Corporation, New York, N. Y., a corporation of Delaware Application September 21, 1945, Serial No. 617,877

7 Claims. (Cl. 343—107)

This invention relates to a pulse translator system responding to pulse signals of a predetermined character and, more specifically, to a system for indicating the occurrence of pulse signals of substantially equal amplitude and of predetermined phase relationship.

There are numerous types of radio beacons, distance indicators, and traffic control units which have been utilized in such applications as aircraft indicating system. These devices are of most value when simple forms of equipment may be employed and when the desired accuracy of indications is obtainable with lightweight installations.

It is often necessary, under many conditions, that a moving craft, an airplane for example, be able to maintain definite course as indicated by a radio signal arrangement. This requires a station for transmitting the signals and equipment on the craft for receiving such signals and utilizing them to indicate the position of the craft with respect to the course. Another important special radio system on a moving craft is one which provides an indication of the instantaneous distance between the moving craft and transmitting station. Also, a traffic control arrangement indicates the presence, number, altitude and distance of aircraft around a certain position at which a pulse transmitter is located. The operation of each of these systems, it will later be shown, is dependent to a large extent upon a device, on the moving craft, for responding to a distinctive signal or plurality of signals radiated by the transmitter and for providing an indication when a predetermined type of signal is received.

A device which produces an output indication of the occurrence of a predetermined distinctive radio signal and which accomplishes this with equipment of very simple and compact design while maintaining a very high degree of accuracy of response constitutes a considerably improved radio indicator. This invention is concerned with such a device operating in pulse signal systems and responding to the occurrence of pulses of equal amplitudes and of definite time relationships.

Therefore, it becomes one object of this invention to provide a simple and accurate system for obtaining a control or indicator output from a distinctive type of pulse input signal.

It is a second object of this invention to provide a radio signal device which produces a pulse output signal of specific characteristic to indicate the presence of radio pulse signals of equal amplitude and of predetermined phase displacement.

Another object is to provide a radio guiding system for a moving craft wherein a course defined by pulse signals of equal amplitude and predetermined phase displacement may be indicated on a radio signal device which responds to such pulse signals.

A further object of this invention is to provide, in a radio pulse system for measuring the distance between a moving craft and a radio pulse transmitter, a simplified device for triggering a pulse repeater transmitter on the moving craft upon reception of two equal amplitude pulse signals at a predetermined phase relation.

In its most elementary form the invention consists of a device for producing an output of pairs of pulse signals, and a vacuum tube, biased beyond cut-off, which is excited by these pulse signals. This combination suffices to produce an output of pulses which includes a pulse signal of a specific width whenever a pair of the exciting pulse signals have equal amplitudes and a definite phase relationship. The output of this combination may be delivered to a width selector and only the desired width of pulses then utilized to trigger a special circuit or actuate an indicator.

When this device is employed in a radio guiding system, a distance measuring system or in other types of pulse repeater circuits, a very definite improvement may be realized in the accuracy and simplicity of these systems. The device is particularly useful in a radio guiding arrangement which utilizes a fixed station to radiate two directional pulse patterns and define a course by the locus of points at which the pulses from each pattern are of equal amplitude. It is also necessary that the pulses in one pattern be displaced in phase from those in the other pattern; this will be more apparent from a later discussion of the invention. In distance measuring systems, the device, located on a moving craft, triggers a pulse repeater transmitter each time the craft is located midway between the directional pulse patterns which are being rapidly rotated about a fixed point.

A much better understanding of this invention and the objects and features thereof will be obtained from the particular description of the above-mentioned embodiments thereof made with reference to the accompanying drawings, in which:

Figs. 1 and 1a consist of graphical representations useful in explaining the theory associated with this invention;

Fig. 2 is a partially schematic and partially block diagram of the basic elements of the invention;

Figs. 3a and 3b show typical wave forms obtained in the apparatus of this invention;

Fig. 4 is a typical pulse width selector which may be used in the system shown in Fig. 2;

Fig. 5 is a combination block and schematic diagram of the receiving equipment in a radio guiding system incorporating this invention;

Fig. 6 is a combination block and schematic diagram of the receiving and pulse repeating equipment in a distance measuring system incorporating this invention;

In Fig. 1a, two directional pulse radiation patterns are represented as transmitted from a single point A, and slightly overlapping. The dotted line midway between the longitudinal axis of the radiation lobes $A_1$ and $A_2$ is the locus of points at which the pulses received from each lobe are of equal amplitude. Line BC is a hypothetical course of an object moving with respect to the stationary lobes and intersecting the aforementioned locus. Fig. 1, curve a shows the pulses in one lobe, say $A_1$, while curve b depicts the pulses in the other lobe, $A_2$. Each lobe contains narrow pulses repeated at regular intervals, those pulses in any one lobe being of the same width and amplitude, and the pulses in one lobe being delayed from those in the other lobe by a predetermined amount, for example, one pulse width. The amplitudes of pulse signals picked up from lobe $A_1$ by a receiver traveling along course BC of Fig. 1a appear in curve c, Fig. 1, while in curve d are shown the pulses similarly received from lobe $A_2$.

The circuit shown in Fig. 2 is a fundamental useful form of the invention consisting of three main components, a pulse signal source 1, a single tube amplifier 2 biased beyond cut-off, and a width selector 3. The pulse source 1, is one which delivers two distinct series of pulses having varying amplitudes and having a phase displacement of approximately one pulse width between the two series. This pulse combination is fed to vacuum tube 2, through a coupling circuit comprised of a coupling condenser, 4, and a grid resistor 5. The grid circuit time constant is of appreciable length compared with the time between pulses and the tube, 2, is normally biased beyond cut-off. The output of this tube is coupled to width selector, 3, through a coupling condenser, 6. The width selector provides a pulse output signal whenever the output from tube 2 is of a predetermined width.

The operation of this circuit may be simply explained by assuming that the pulse output of the pulse source, 1, in Fig. 2, consists of a combination of the signals represented in curves c and d of Fig. 1 as shown in Fig. 3 corresponding to the radiations received from transmitter 31 by antenna 32. Tube 2 of Fig. 2 should have a cut-off bias and a normally fixed bias as illustrated in Fig. 3b. Pulses from source 1, in Fig. 2, are shown in Fig. 3b in combination with the fixed grid bias for tube 2; changes in the bias, as indicated by 7, are determined by grid current flowing through grid resistor 5 whenever the signal pulses cause the grid of tube 2 to become positive with respect to the cathode thereof. This provides a gain control for the tube conditioned by the larger amplitude of the applied pulses, effectively accentuating the amplitude differences of pulses differing in amplitude. Thus only when the adjacent pulses are of substantially equal amplitude will they both exceed the cut off bias of the tube. The voltage pulses occurring in the output of the tube 2 are of the form represented in Fig. 3a, and a pulse of double width such as that indicated by 8 or of some other composite width or form, is the indication that two pulse signals of equal amplitudes and a predetermined phase displacement have been delivered to the tube 2 by signal source 1. Pulse selector 3 responds to the occurrence of voltage pulses of a characteristic relationship, such as shown at 8, by producing a single pulse signal which may actuate any desired indicator in some systems where this circuit is employed.

A typical width selector for use in this invention is schematically diagrammed in Fig. 4. Preferably, this selector circuit includes a limit clipping stage, incorporating tube 9, as an input coupler which limits all input pulses to substantially the same amplitude. The output pulse energy from this stage is applied to a shock-excitable L-C circuit 10 through a resistance 11. Across the tunable circuit 10 is connected a vacuum tube, 12, having its anode, 13, connected to the side of circuit 10 which is connected to the anode potential source and having its cathode, 14, connected to the opposite end of the tunable circuit. The anode, 15, of tube 9 in the limit clipping stage is connected to the grid, 16, of tube 12 so that connection between the cathode 14 and anode 13 is blocked, while pulse energy is applied to circuit 10. The undulations produced in circuit 10 in response to the pulses applied thereto from the clipping stage are applied through connection 17 to a threshold clipping amplifier stage incorporating tube 18. Adjusting resistor 19 controls the bias on grid 20 of tube 18. A pulse width shaper 21 coupled to the anode 22 of this tube completes the selector system.

When a rectangular pulse is applied to the tuned circuit 10, the initial sinusoidal undulation in this circuit is caused by the sudden voltage change corresponding to the leading edge of the pulse. When the trailing edge of the pulse is reached, the circuit 10 is again shock excited but in a different direction from the previous excitation. If circuit 10 is tuned to a frequency the period of which is exactly twice the width of a certain pulse, the trailing edge of this pulse will occur at the point where the sinusoidal undulation 10 crosses its zero axis, hence the second half cycle of the undulation will be reinforced and will reach a high amplitude. Pulses of other widths will have a damping effect when the edges of these pulses do not coincide with the points at which the undulations in the tuned circuit pass through a zero value. The damping tube 12 prevents any further oscillations in the tuned circuit and the threshold clipping stage involving tube 18 clips at a level whereat only the crest of the reinforced undulation is passed. A pulse shaper follows, including, for example, a differentiator and a clipper stage which produce an output pulse at a definite time relationship to the input pulse of desired width.

An application of my invention to a receiving network for a radio guiding system is diagrammed in Fig. 5. This system employs substantially the same circuits shown in Fig. 2 and, in addition, two indicating devices. The pulse signal source of Fig. 2 is constituted by an antenna 23 and receiver 24, including a detector and video amplifier. Output pulses from the width selector 3 actuate an "on course" indicating device 25. The purpose of the "o course" indicating device 26 is to supply information regarding the side of the course on which the receiving network is located so that this receiving network may be maneuvered back onto the desired course. A pair of pulse radiation patterns, such as depicted in Fig. 1a are transmitted from a fixed station for the purpose of establishing a radio guiding course along the path midway between the longitudinal axes of the two lobes. A craft moving with respect to these lobes will receive, on apparatus of the type just described, an indication on the "on course" indicator when coincident with the course. At other positions, the "off course" indicator will show on which side of the course the craft is located so that corrections can be made. This last mentioned indicator may comprise any simple means for comparing the amplitude of the received pairs of pulses; a cathode ray tube may, for example, be utilized to display the pulses on its screen for visual comparison.

When used in a distance indicating device like that in Fig. 6, the system shown in Fig. 2 is modified to include an antenna 27 and receiver 28 in place of the pulse source. The width selector 3 triggers a pulse transmitter 29 upon reception of a pair of pulses of equal amplitude and of predetermined phase displacement. If the same antenna is employed for reception of pulses and for transmission of pulses, a transmission reception switching box, 30, is necessary to prevent the latter pulses from being fed directly into the receiver 28. The complete distance indicating system also necessitates a transmitting station emitting pulse patterns of the type shown in Fig. 1a, these patterns being continuously revolved about the transmission point. Each time the pulse patterns scan a craft equipped with the apparatus disclosed above, the pulse transmitter on the craft will be triggered into operation by the reception of equal amplitude occurring at one position of the craft with respect to the two pulse lobes. Pulses radiated by the transmitter on the moving craft will be received at the station and retransmitted back to the craft. The time interval of this sequence of actions will represent a distance, hence suitably calibrated systems may be used to indicate the spacing between craft and station. The rotation of the transmitting and receiving antennas at the station must be sufficiently slow to allow for the very rapid transmissions and retransmissions while there is a substantially fixed orientation of the craft with respect to the directional station antennas.

If desired the system may be modified by the use of different pulse frequencies or different widths in the two radiation lobes to aid in recognizing the pulses of either one of the lobes. The width selector specifically referred to may be replaced by any pulse selector which will distinguish the composite pulses from other pulses in the train. Likewise, the course indicating devices may assume many forms.

The principles of this invention have been described with reference to particular embodiments thereof, but many modifications of the specific disclosures made herein may be devised without departing in spirit from this invention. Although several examples have been included herein, they are intended merely by way of illustration and should not be construed as limitations on the scope of my invention as set forth in the objects thereof and in the accompanying claims.

I claim:

1. A pulse translator system, comprising a source of two pulse trains wherein equal width pulses of each train vary in amplitude, said trains being so displaced in time from one another that pairs of pulses are distinguishable and include one pulse from each of said trains, an electron discharge device coupled to the output of said source, means for normally biasing said device at a predetermined level below cut-off, whereby only pulses causing the bias to exceed cut-off will produce an output signal from said device, and means coupled to said device to lower said bias in response to applied pulses which create a positive bias, whereby a difference in amplitude of applied pulses of each pair will be accentuated and only pairs of substantially equal amplitude pulses will cause pairs of pulses to occur in the output of said electron discharge device.

2. A pulse translator system, including a source of two pulse trains wherein equal width pulses of each train vary in amplitude and wherein said trains are time displaced so that pairs of pulses may be distinguished which have one pulse from each of said trains, an electron discharge device coupled to the output of said source, means for normally biasing said device at a predetermined value below cut-off so that only pulses which raise the bias beyond cut-off produce an output signal from said device, means coupled to said discharge device to decrease said bias in response to applied pulses creating a positive bias, whereby differences in amplitude of applied pulses of each pair will be accentuated and whereby a pulse signal output of single pulses in the output of said discharge device will occur when the applied pulses are of unequal amplitude and pairs of pulse signals will occur when applied pulses are of equal amplitude, and pulse selector means for producing a response to said pairs of pulse signals in the output of said electron discharge device.

3. A pulse translator system according to claim 2, wherein said time displacement is substantially the width of one pulse whereby the pulses of said pairs will be substantially contiguous, and said pulse selector comprises means for selecting pulses of a predetermined width substantially equal to twice the width of a single pulse.

4. A system for producing a pulse indication in response to the occurrence of pairs of pulses having substantially equal amplitudes and a predetermined time displacement, comprising means for delivering a pulse output including said pairs of pulses, a vacuum tube biased beyond cut-off, means connecting said pulse output to the input of said tube, a pulse selector adjusted to select pairs of pulses of the aforementioned type and produce a pulse signal output in response thereto, and means connecting the output of said tube to said selector.

5. A system for indicating the occurrence of pairs of pulses having substantially equal amplitudes and a predetermined time displacement, comprising means for producing a pulse output which includes said pairs of pulses, a vacuum tube biased beyond cut-off, means connecting said pulse output to the input of said vacuum tube, a pulse selector adjusted to select said pairs of pu'ses, means connecting the output of said tube to said pulse selector and indicating means connected with and actuated by the pulse output of said selector.

6. In a radio guiding system wherein a course is defined by the path midway between directive radiation patterns and wherein pulse signals are transmitted from a given station to establish two directive radiation patterns so timed that the pulses in one pattern bear a predetermined time relationship to those of the other pattern, a receiver system comprising means for receiving said pulses at a moving craft, means responsive to the amplitude of said pulses for indicating on which side of said course said craft is located, and means responsive to pulse signals of substantially equal magnitudes and of predetermined time relationships to provide an indication of predetermined pulse width when said craft is on a path midway between the longitudinal axes of said radiation patterns, said last-named means comprising a pulse receiver connected to a vacuum tube biased beyond cut-off, a pulse selector excited by pulses of said predetermined width in the output of said vacuum tube, and an indicating means responding to signals delivered by said width selector.

7. In a radio pulse repeater system, including a station radiating pulse signals over two directive radiation patterns which are continuously rotated about said station and wherein the pulses of said patterns establish pairs of pulses composed of one pulse from each of said patterns, a pulse repeater system comprising means for receiving said pairs of pulses; means for producing an indication whenever said pairs of pulse signals are received with equal amplitudes and have a predetermined time relationship; said last-named means comprising an electron discharge device normally biased beyond cut-off so that only pulses which raise the bias beyond cut-off produce an output from said device, means connecting said device and receiving means, means coupled to said discharge device to decrease said bias whenever the received pulse create a positive bias, whereby differences in amplitude of the received pulses of each pair will be accentuated and whereby a pulse signal output of single pulses in the output of said discharge device will occur when the pulses applied to said device are of unequal amplitude and pairs of pulses will occur in said output when the applied pulses are of equal amplitude, a pulse selector, and means connecting the output of said device to said pulse selector; means for radiating distinctive pulses associated with said receiving means in response to the output pulses from said selector.

SVEN H. M. DODINGTON.

REFERENCES CITED

The following references are of record in the file of this patent:

UNITED STATES PATENTS

| Number | Name | Date |
| --- | --- | --- |
| 2,157,677 | Runge | May 9, 1939 |
| 1,169,742 | Scharlau | Aug. 15, 1939 |
| 2,176,469 | Moueix | Oct. 17, 1939 |
| 2,266,401 | Reeves | Dec. 16, 1941 |
| 2,410,117 | Weston | Oct. 29, 1946 |
| 2,419,525 | Alford | Apr. 29, 1947 |
| 2,444,426 | Busignies | July 6, 1948 |